United States Patent [19]

Klabes

[11] Patent Number: 4,652,103
[45] Date of Patent: Mar. 24, 1987

[54] COLPOSCOPE WITH PHOTOGRAPHIC EQUIPMENT

[75] Inventor: Karl-Heinz Klabes, Berlin, Fed. Rep. of Germany

[73] Assignee: Leisegang Feinmechanik Optik GmbH, West Berlin, Fed. Rep. of Germany

[21] Appl. No.: 676,644

[22] Filed: Nov. 30, 1984

[30] Foreign Application Priority Data

Nov. 28, 1983 [GB] United Kingdom ................ 8334399

[51] Int. Cl.⁴ ...................... G03B 17/48; G02B 21/00
[52] U.S. Cl. ...................................... 354/62; 354/79; 350/502
[58] Field of Search ..................... 354/62, 79; 350/502

[56] References Cited

U.S. PATENT DOCUMENTS

| 3,987,463 | 10/1976 | Nishikawa et al. | 354/79 X |
| 4,134,637 | 1/1979 | Leisegang | 354/79 X |
| 4,284,338 | 8/1981 | Ikuno | 354/62 X |

Primary Examiner—William B. Perkey
Attorney, Agent, or Firm—Ralf H. Siegemund

[57] ABSTRACT

The present invention relates to a colposcope with photographic equipment that uses stereo slides of the immediate developement kind. The problem is solved by using one or two prisms as a deflecting element and mounting a deflection mirror in an adjustable manner.

5 Claims, 2 Drawing Figures

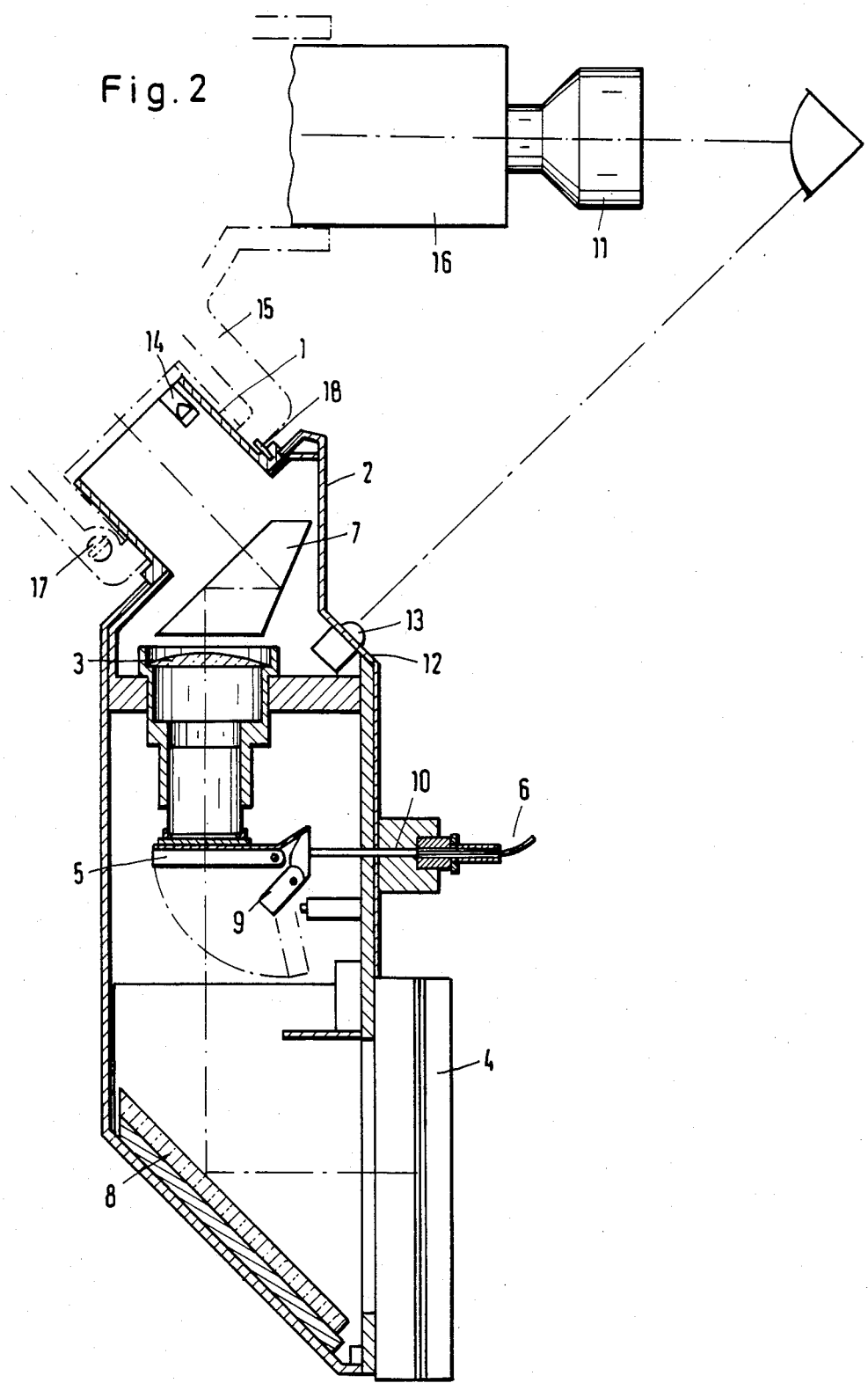

COLPOSCOPE WITH PHOTOGRAPHIC EQUIPMENT

BACKGROUND OF THE INVENTION

The present invention relates to a colposcope with photographic equipment in accordance with the preamble of claim 1

Colposcopes as they are predominantly used by gynecologists in their office practice or clinic serve primarily for viewing the vaginal area during a checkup as well as during treatment.

Particular features here are the preferably enlarged imaging in connection with special illumination. The viewer looks primarily through two eye pieces similar to a telescope. The images have the correct side by side position and are true to color. A larger working distance permits manipulation in the object space and clinical intrusion during the colposcopic viewing. Colposcopes are equipped with stereoscopic image ray path for better spatial recognition and manipulation. For achieving important findings or as memory for further treatment procedures particularly covering long periods of time it is necessary to take a picture of the object portion on a carrier as viewed through the colposcope. Since the viewing is carried out stereoscopically the pictures are correspondingly adapted for stereoscopic reproduction.

The German petty patent No. 7,639,305 corresponding to U.S. Pat. No. 4,134,637 made known a colposcope with photographic equipment in accordance with the the introductory paragraph above which makes possible the production of immediately available stereoscopic pictures and prints. The content of that reference is incorporated herein by reference.

DESCRIPTION OF THE INVENTION

It is an object of the present invention to further develop and improve the colposcope of the type mentioned above specifically a colposcope as disclosed in the U.S. Pat. No. 4,134,637 so that inter alia stereo slides of the immediate development kind can also be produced. The problem is solved by the characterizing feature of the main claim. Preferred configurations of the invention are given by the dependent claims.

Herein the colposcope is further characterized in that the rear wall of the case of the photographic equipment as arranged underneath the eye piece of the colposcope, is provided in the direction of viewing and behind the eye piece with a step 12; the normal to the plane of the step has an angle of 45 degrees relative to the eye piece axis; the intersection of the eye piece axis and of the areal normal running through the center of the surface of the step is positioned in front of or within the last lens of the eye piece, and luminous diodes (13) are provided in the surface of this step which indicate operability of the photographic equipment of the colposcope. The luminous diodes may be differently configured. The film cassette includes instant image material which after illumination can be shifted out of the cassette through a switching pulse issued by the shutter of the optical system to a motor drive. The tube of the photographic equipment includes a transducer controlling the flap shutter of the photographic equipment.

The viewing portion of the optical equipment is comprised of a stereoscopic near field projection portion for the ray path used for viewing and by a camera ray path having the same object distance and being associated to the viewing path. On the output side at one of the camera portions associated with the system two projection images are produced approximately in a format of one-to-one as far as the viewing size of the object is concerned.

The viewing of the object is carried out through binoculars. The object size i.e. the viewing portion is the same as the one dedicated to the photography. Correspondingly the illuminating area is adjusted by means of the illuminating object. The ray path is stereoscopically provided and permits viewing at approximately a 12-fold enlargement. The photographic device guides the images through deflection mirrors to the film material. It is possible to take pictures on suitable film material and to obtain slides within the shortest possible time which slides can then be viewed. These slides are comprised of two image portions there being an exact separation of the two image halves. Each image half images the object from an angle which is determined by the input objective and the respectively associated ray path of the system.

A light sensitive transducer, e.g. an infrared transducer, is installed in the tube of the photographic equipment according to a further embodiment of the invention which transducer triggers the camera function if an object is positioned in the intersection of the axes of the viewing ray path, the camera ray path, and the illuminating ray path respectively. This means that photographic images are taken only when the colposcope is exactly positioned in relation to the object. It is further made possible through the chosen special arrangment of illuminating diodes which indicate the function of the colposcope to test also the function of the colposcope during the observation of the image through the eye piece. This enables the treating physician to produce quickly and precisely instant images which are supposed to be diagnostic with regard to the ailment.

DESCRIPTION OF THE DRAWINGS

The invention will be explained in connection with the drawings which depict embodiments.

Herein

FIG. 2 is a view similar to FIG. 1 showing further improvements.

Figure 1:
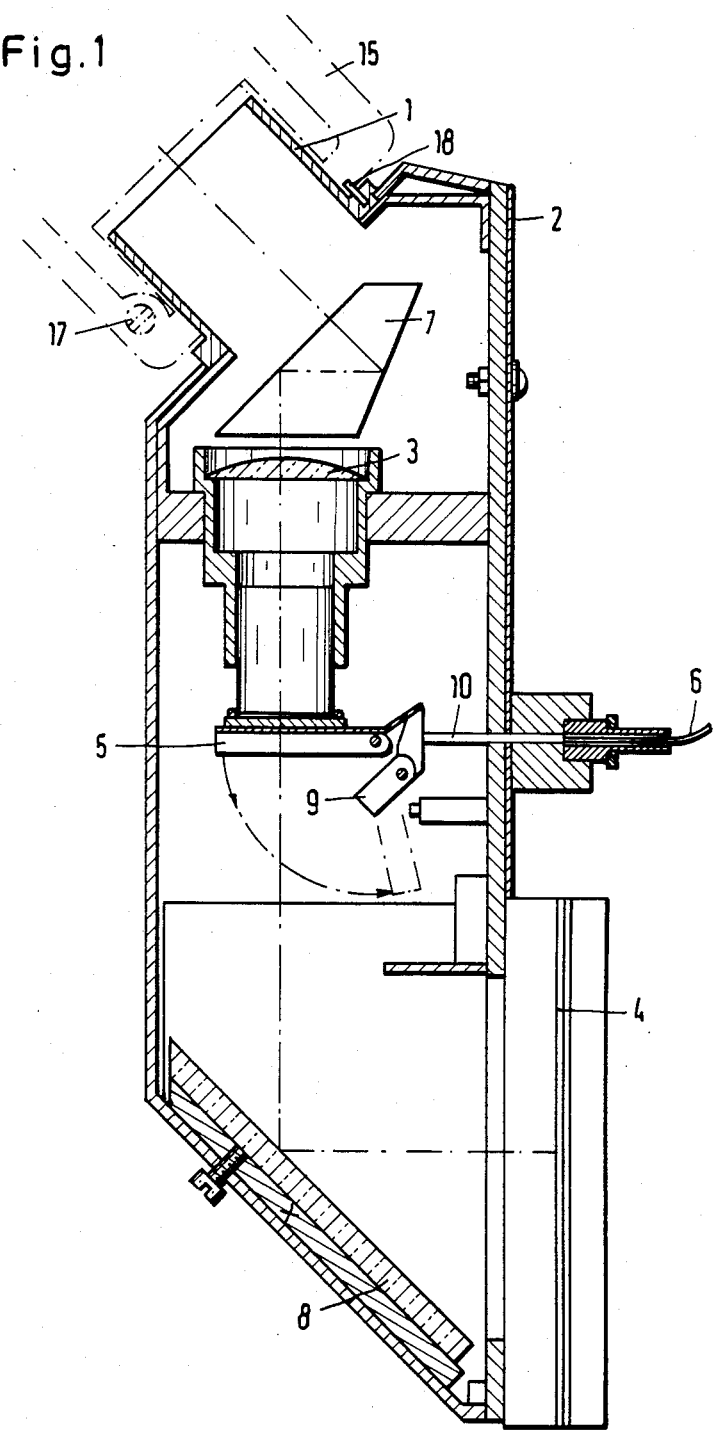
FIG. 1 illustrates a section through the photographic equipment.

Of the colposcope only the connecting part 15 for the photographic equipment is illustrated in the figures, namely the photoelectric equipment as inserted into the guide tube and into the colposcopic casing and is clamped by means of a screw 17. The latch pin 18 is inserted in a corresponding latch bore and arrests the rotational position.

The rays running from the object through the colposcope are guided to the field lenses by means of one or two side by side arranged prisms 7. These ray paths are then run through the projection objectives towards the deflection mirror 8 and to the image plane in the cassette 4.

The prisms exchange the sides for the pictures produced onto the film.

A flap shutter 5 having its flap and a seal with sealing ring is arranged on the shaft for purposes of controlling the illuminantion, the shutter closes or opens the projection objectives. The opening is caused by a switch lever on a shaft whenever the plunger 10 is advanced by pressure actuation of the wire cable 6.

The closing occurs after triggering and through effectiveness of a spring.

A lever can be placed into contact with a not illustrated switch by means of the turning motion of the shaft which switch causes a short circuit of the synchronous plug socket for the discharge of a flashlight. The position of the lever is chosen so that the switching function occurs with open shutter. Furthermore it is provided that through this shutter a turn on pulse for a motor drive issues which shifts the exposed film material out of the holder 4.

Herein a light sensitive transducer, e.g. an infrared transducer, is arranged in tube 1 and associated with the photographic equipment which transducer triggers the function of the photographic equipment i.e. of the flap shutter only when the object is positioned exactly in the intersection of the axes of the viewing ray path, of the camera ray path and of the illumination ray path. This means that faulty photographs will not issue not even if the release of the photographic equipment has been actuated accidentally.

The FIG. 2 illustrates a preferred embodiment of the invention. The colposcope in accordance with this embodiment is furthermore provided with a number of luminous diodes 13 provided at the rear wall 2 of the casing of the photographic equipment which diodes exercise a monitoring function. The shape of the latter diodes corresponds here to a particular control function. For example, the first one of these diodes has a round configuration and indicates the current supply for the power connection, a second, rectangularly configured diode indicates the flash connection and a further for ex. triangularly configured diode indicates the end of the film and also the ejection of the cover sheet of the photocassette 4.

The colposcope photographic equipment is ready for operation e.g. when all diodes light up green.

Since the diodes 13 are provided underneath the eye piece 11 at a surface 12 having an angle of 45 degrees between the normal to that surface and the viewing axis and since the intersection of the viewing axis and the normal running through the center of the surface 12 on the side is situated on the eye piece axis preferably in an area just shortly in front of the eye piece it is possible to view the image in the eye piece as well as the diode 13 at a corresponding distance from the eye piece 11. The operability of the colposcope can therefore be tested by the viewer without having to reposition his head vis-a-vis the eye piece.

I claim:

1. Photographic equipment including a casing to be connected to a coposcope being provided with an eye piece and an objective lense, a connection sleeve for connection to a tube of the colposcope,; first light path deflecting means in the tube, an image field lense placed downstream from the deflecting means; a deflecting mirror placed downstream from the field lens and a photographic film cassette covering the image area of the deflecting means and mirror; and a flap shutter disposed upstream from the deflecting mirror the improvement, comprising, at least one prism being provided as the first deflector means and the deflection mirror being are adjustably positioned in the casing.

2. Colposcope according to claim 1 characterized in that a rear wall (2) of the casing of the photographic equipment is arranged underneath an eye piece (11) of the colposcope and being provided in the direction of viewing and behind the eye piece (11) the casing having a step 12 the normal to the plane of the step (12) having an angle of 45 degrees relative to the eye piece axis, the intersection of eye piece axis and of the areal normal running through the center of the surface of the step 12 is positioned in front of or within the last lens of the eye piece (11) and luminous diodes (13) being provided on said step which indicate operability of the photographic equipment of the colposcope.

3. Colposcope in accordance with claim 1 characterized in that the luminous diodes (13) are differently configured.

4. Colposcope in accordance with claim 1 characterized in that the film cassette (4) includes instant image material which after illumination can be shifted out of the cassette through a switching pulse issued by the shutter of the optical system to a motor drive.

5. Colposcope in accordance to claim 1 characterized in that in the tube (1) of the photographic equipment a transducer (14) is arranged, controlling the flap shutter (5) of the photographic equipment.

* * * * *